Dec. 27, 1960 P. J. LOUI ET AL 2,966,437
MOLDED DOILY AND APPARATUS FOR FORMING SAME
Filed June 18, 1959 4 Sheets-Sheet 1

Inventors
Philip J. Loui
John J. Motyka
By Wallenstein & Spangenberg
Attys.

Dec. 27, 1960 P. J. LOUI ET AL 2,966,437
MOLDED DOILY AND APPARATUS FOR FORMING SAME
Filed June 18, 1959 4 Sheets-Sheet 2

Inventors:
Philip J. Loui
John J. Motyka
By Wallenstein & Spangenberg
Attys.

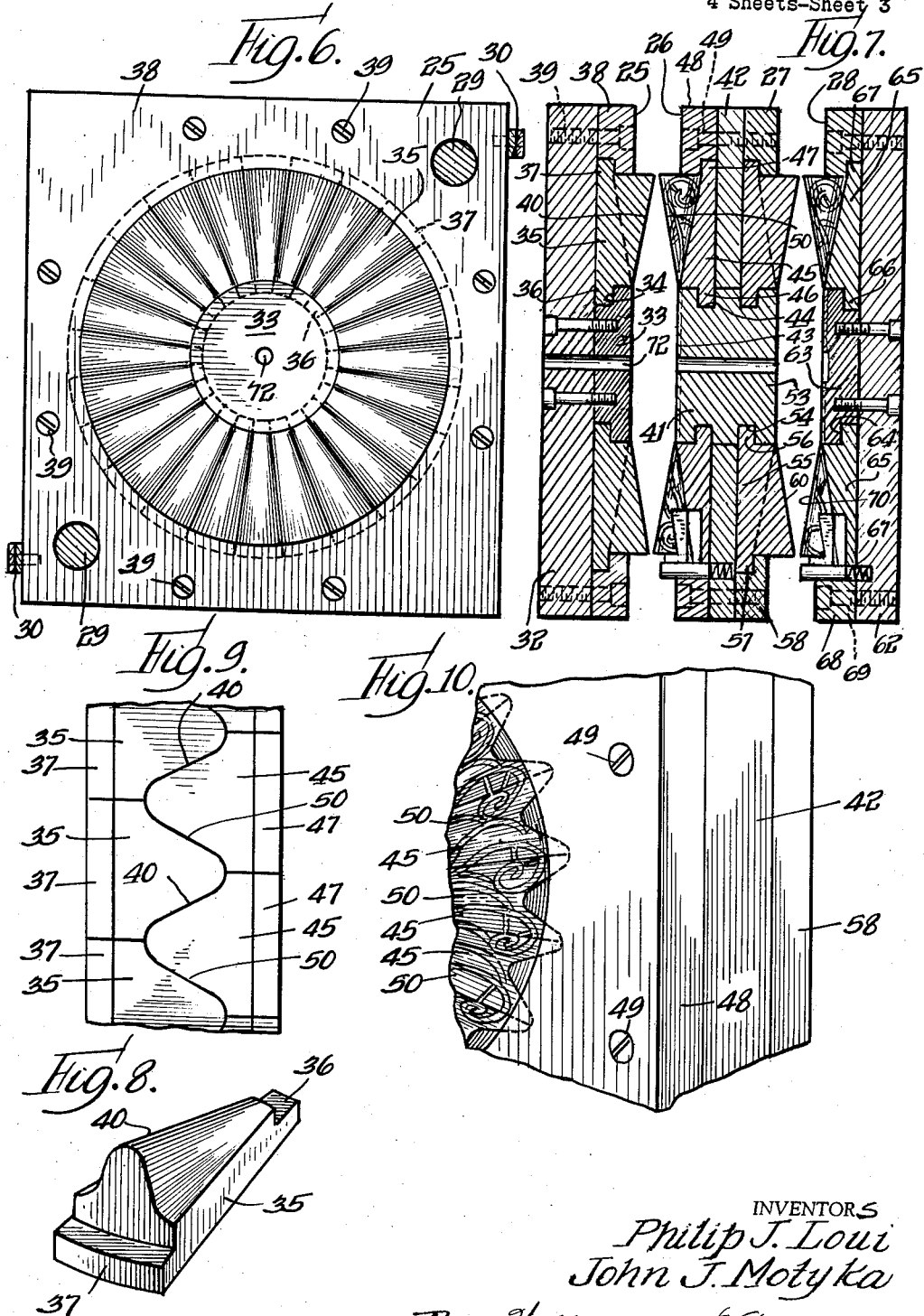

Dec. 27, 1960 P. J. LOUI ET AL 2,966,437
MOLDED DOILY AND APPARATUS FOR FORMING SAME
Filed June 18, 1959 4 Sheets-Sheet 4
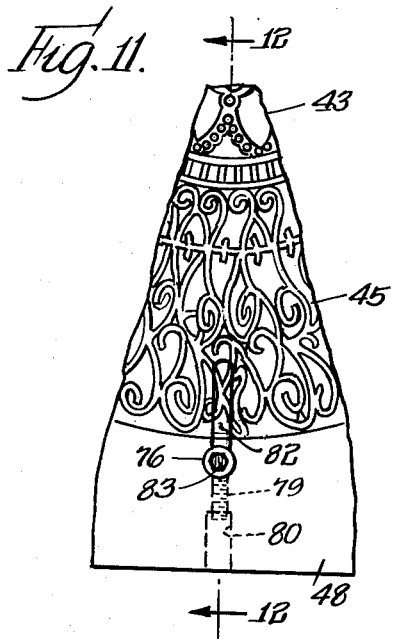
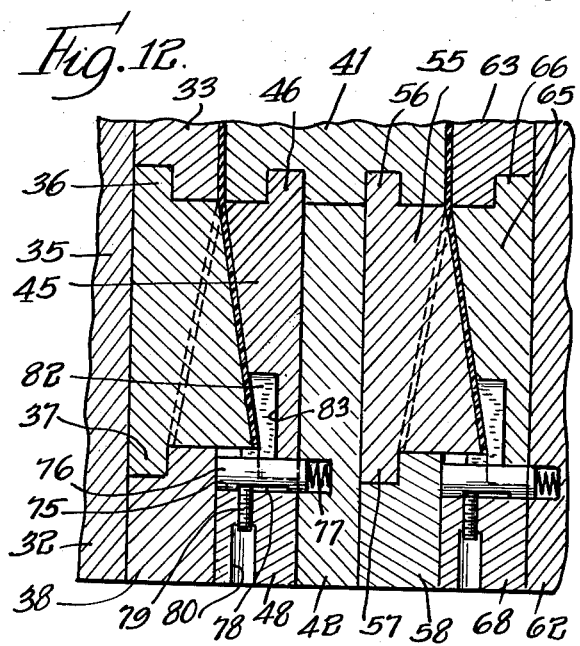
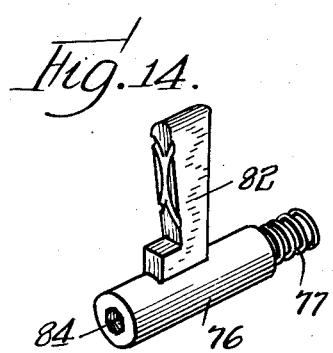
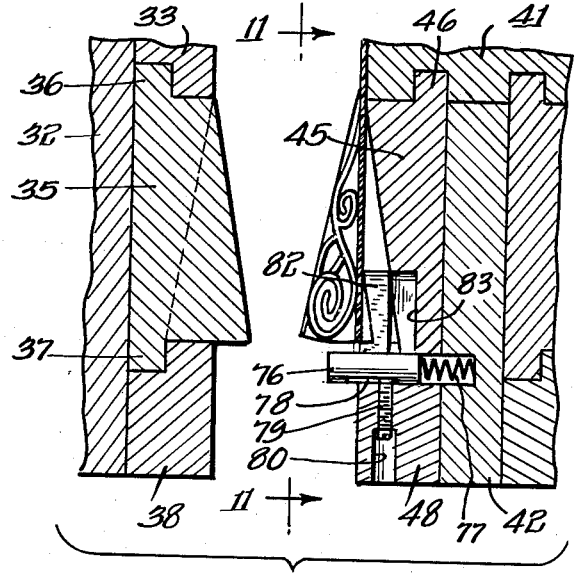
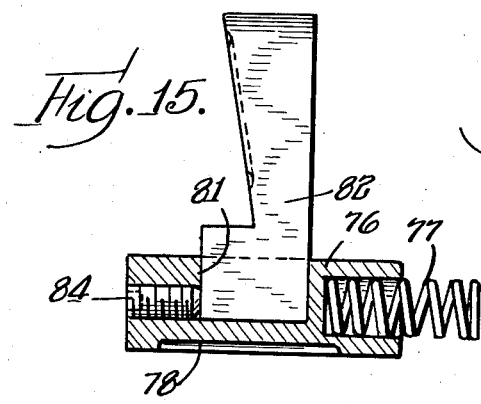
INVENTORS
Philip J. Loui
John J. Motyka
By: Wallenstein & Spangenberg
Attys

United States Patent Office 2,966,437
Patented Dec. 27, 1960

2,966,437

MOLDED DOILY AND APPARATUS FOR FORMING SAME

Philip J. Loui and John J. Motyka, Chicago, Ill., assignors to Selfix Products Company, Chicago, Ill.

Filed June 18, 1959, Ser. No. 821,225

8 Claims. (Cl. 154—47)

An object of this invention is to provide a molded single piece ruffled doily which comprises a single sheet of synthetic plastic material which is of substantially the same thickness throughout, which is flexible and resilient throughout, which has a permanent preset configuration to which it resiliently returns following flexing therefrom, and which in permanent preset configuration has a planar central portion and a marginal portion about the central portion wherein the surface area of the marginal portion from the central portion to the outer periphery is progressively greater than a corresponding planar area, and wherein the marginal portion is uniformly formed in ruffles which increase in amplitude from the central portion to its outer periphery. Such a single piece ruffled doily has advantages which have not heretofore been obtainable. It may be readily cleaned by sponging or washing, even in washing machines, without in any way loosing its permanent preset configuration, and when it is flattened out or flexed in handling or in use, it readily resiliently returns to its permanent preset condition. It is never limp and it needs no shaping and no starching or stiffening in order to shape. It will never catch or ravel or run. It is extremely pleasing to the eye in addition to being functionally serviceable and it may be readily inexpensively manufactured on a large production basis. While the single piece ruffled doily may have any desired peripheral configuration such as polygonal, ovate, circular or the like, it is illustrated herein as circular for disclosure purposes. Also, while the uniform ruffles may have various configurations, such as saw-tooth, square or the like, they are preferably substantially sinusoidal or rounded and are so illustrated herein for disclosure purposes.

The central and marginal portions of the formed single piece ruffled doily preferably have openings therein for ornamental purposes. While the single piece ruffled doily may be molded from any suitable material such as synthetic plastic treated or impregnated paper or the like capable of being formed into the desired shape, preferably it is molded from a synthetic plastic material, such as, thermoplastic material and is made up of synthetic plastic webs extending predominantly radially from the center thereof, the spaces between the webs forming the ornamentation openings.

Another object of this invention is to provide a method for molding the single piece ruffled doily and, in this respect, the single piece ruffled doily is molded between a pair of pressure operated dies having central mating planar portions having uniform alternate male and female sections which increase in amplitude from the central portions to their outer peripheries. The single piece ruffled doily is preferably injection molded from a synthetic thermoplastic material and the synthetic plastic material is injected between the pair of dies through central openings therein for outward flow therebetween. Preferably, a plurality of pairs of dies are arranged in tandem relation for multiple molding of the doily, and by so doing less pressures are required on the dies than if the dies were located side by side.

Another object of this invention is to provide an improved die construction for forming the single piece ruffled doilies. Preferably, the marginal mating portions of the dies, which are arranged about the central mating planar portions of the dies and which have uniform alternate male and female sections which increase in amplitude from the central portions to their outer peripheries, comprise a plurality of radially arranged die members which are secured in place about the mating central planar portions. At least one of each pair of dies is preferably provided with grooves extending predominantly radially from the center through which the synthetic plastic material flows outwardly to provide the ruffled doily with an open design consisting of a plurality of webs extending predominantly radially from the center thereof. One of each pair of dies is also preferably provided with a knock-out mechanism for releasing the molded ruffled doilies from the dies when the dies are opened following the molding operation so that the doilies may be readily removed from the dies.

Further objects of this invention reside in the details of construction of the single piece ruffled doily and of the apparatus for forming the same, in the details of the method for forming the single piece ruffled doily, and in the cooperative relationships between the component parts of the single piece ruffled doily and the apparatus, and between the method steps.

Other objects and advantages of this invention will become apparent to those skilled in the art upon reference to the accompanying specification, claims and drawings in which:

Fig. 6 is a vertical sectional view, taken substantially along the line 6—6 of Fig. 5 and showing in elevation the left hand die of Fig. 5;

Fig. 7 is a vertical sectional view through the die construction illustrated in Figs. 5 and 6, the pairs of dies being separated, but to a lesser extent than illustrated in Fig. 5;

Fig. 8 is a perspective view of one of the die sections or members utilized in the pairs of dies;

Fig. 9 is an end elevational view of a plurality of die sections or members arranged in closed position;

Fig. 10 is a perspective view of a portion of one of the dies;

Fig. 11 is an elevational view of a portion of one of the dies illustrating a means to assist in removing a formed ruffled doily from the die and taken substantially along the line 11—11 of Fig. 13;

Fig. 12 is a sectional view through a portion of the die construction, taken substantially along the line 12—12 of Fig. 11 and showing the dies closed;

Fig. 13 is a view similar to Fig. 12 but showing the dies opened;

Fig. 14 is a perspective view of a knock-out mechanism illustrated in Figs. 11–13; and Fig. 15 is a sectional view through the knock-out mechanism.

Figure 1:
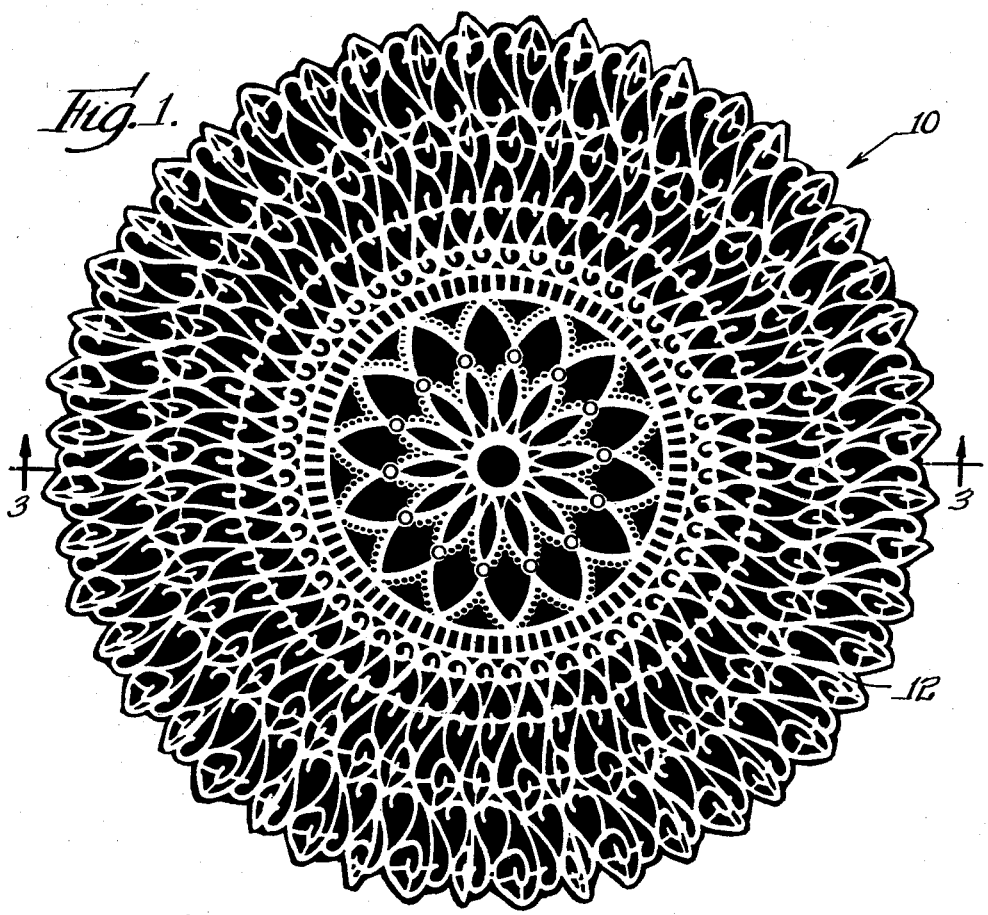
Fig. 1 is a plan view illustrating the single piece ruffled doily on a black back ground so as to more clearly show the open design including the webs which extend predominantly radially from the center thereof.
Figure 2:
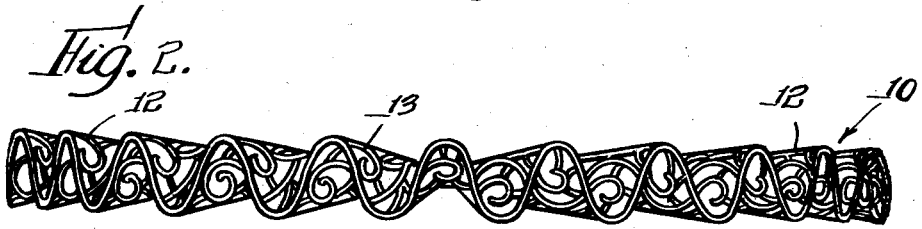
Fig. 2 is a side elevational view of the single piece ruffled doily.
Figure 3:
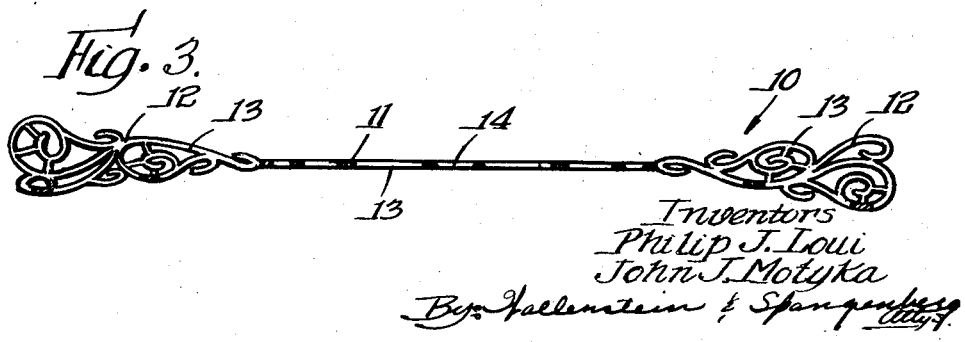
Fig. 3 is a sectional view through the single piece ruffled doily, taken substantially along the line 3—3 of Fig. 1.

One form of the single piece ruffled doily of this invention is generally designated at 10 in Figs. 1 to 3. It comprises a single sheet of synthetic plastic material which is of substantially the same thickness throughout, which is flexible and resilient throughout, which has a permanent preset condition to which it resiliently returns following flexing therefrom, and which in permanent preset configuration includes a central planar portion 11 and a marginal portion 12 about the central portion. The surface area of the marginal portion 12 from the central portion 11 to the outer periphery of the marginal portion 12 progressively increases and is progressively greater than a corresponding planar area. This marginal portion 12 is uniformly formed in ruffles which increase in amplitude from the planar central portion to the outer periphery of the marginal portion. The ruffles may have various desired configurations but, for purposes of illustration herein, they are shown to have a sinusoidal or rounded configuration. Because of the excess material in the marginal portion 12 of the ruffled doily, the ruffles extend above and below the planar surface of the central planar portion 11 in a uniform ruffled manner. The central and marginal portions of the ruffled doily preferably have a plurality of openings therein for ornamental purposes and, preferably, these openings are formed by interconnecting webs 13 which extend predominantly radially from the center 14 of the ruffled doily, these webs being formed by corresponding grooves in the dies into which a synthetic thermoplastic material is injected from the center of the dies. The ruffled doily, of course, may be formed to have any desired open design but, preferably, the webs of the open design extend predominantly radially from the center so as to facilitate the flow of the thermoplastic material during the formation of the doily. Any suitable synthetic thermoplastic material which is flexible and resilient may be utilized, as for example, polyethylene or the like.

A method and apparatus for forming or molding the ruffled doily 10 are illustrated in Figs. 4 to 15, and the apparatus may include a conventional injection molding machine having a stationary head 16 provided with a thermoplastic feed line 17 which feeds thermoplastic material under high pressure through a central opening 18 in the head 16. The machine also includes a movable head 19 which is moved by a pressure operated rod 20 along guide rods 21. Thus, the head 19 may be reciprocated with respect to the head 16 and appreciable pressures may be applied to the movable head 19 by the operating rod 20.

Figure 4:
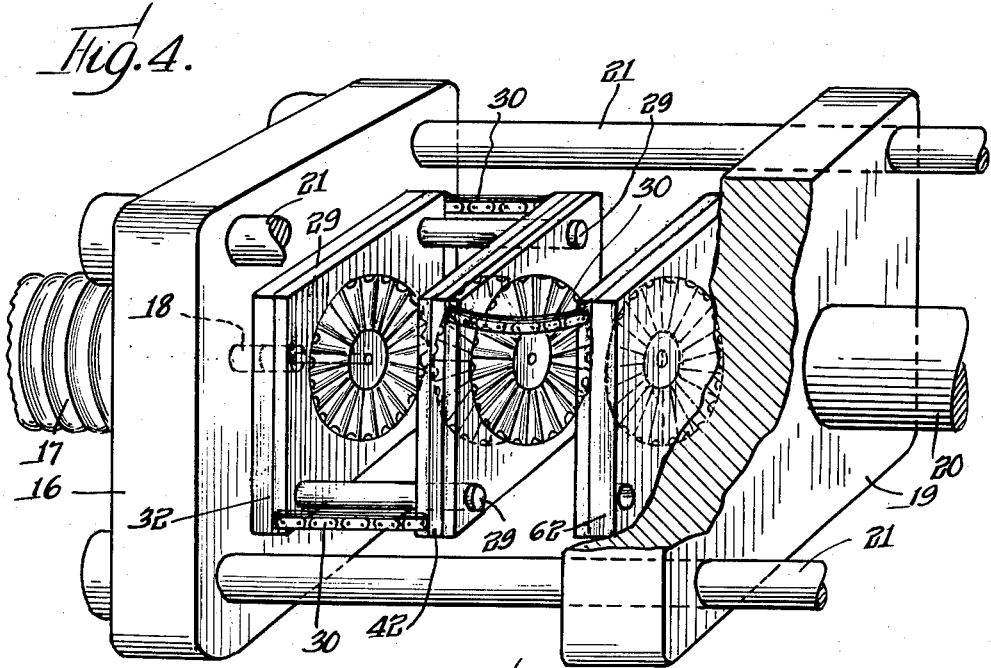
Fig. 4 is a perspective view, partly broken away, of a portion of an extrusion molding machine having a plurality of pairs of dies arranged therein for forming a plurality of single piece ruffled doilies, the dies and machine being shown in open position.
Figure 5:
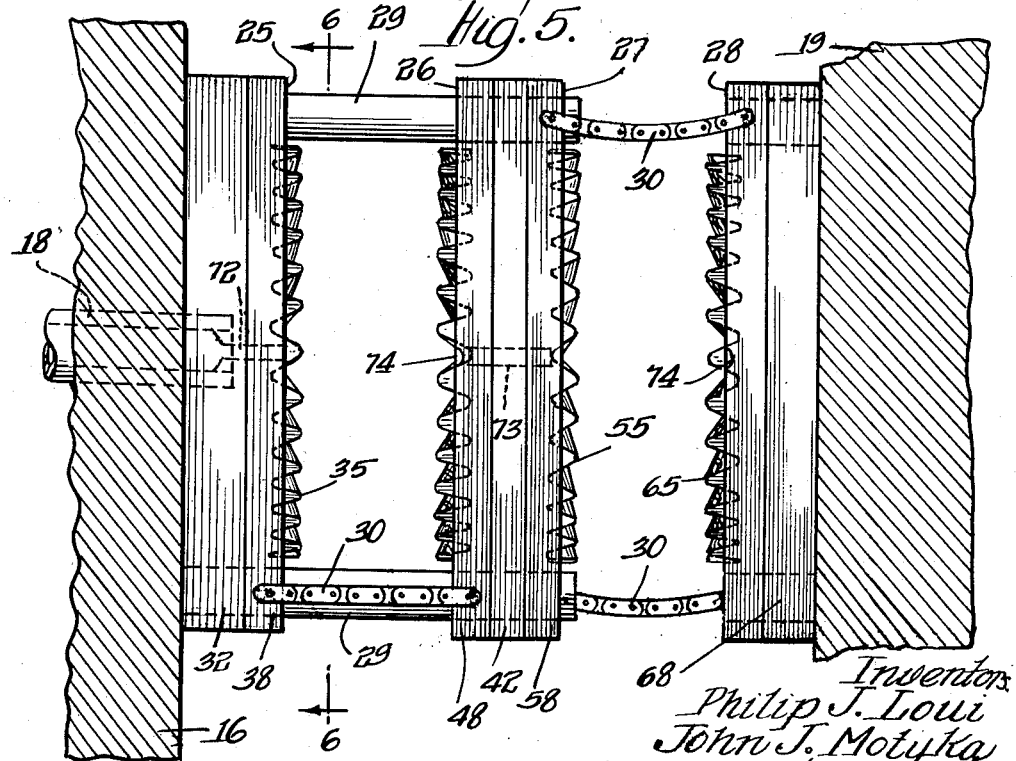
Fig. 5 is an enlarged elevational view of the die construction illustrated in Fig. 4.

Arranged between the stationary head 16 and the movable head 19 of the molding machine are two pairs of dies 25, 26 and 27, 28, these pairs of dies being supported for movement with respect to each other by guide rods 29. The pairs of dies are interconnected by chains 30 so as to control the relative movements thereof. The die 25 is carried by the stationary head 16 and the die 28 is carried by the movable head 19. When the movable head 19 is moved toward the stationary head 16, the two pairs of dies are tightly closed with considerable force afforded by the rod 20. When the movable head 19 is moved away from the stationary head 16, the two pairs of dies are separated as illustrated in Figs. 4 and 5, the separation being controlled by the chains 30.

The die 25, as shown more clearly in Figs. 6 and 7, includes a base member 32 which is centrally provided with a central planar die portion 33 secured to the base member by screws, this portion being undercut, as indicated at 34. Radially arranged about the central planar portion 33 are a plurality of die members 35 which have tongues 36 at one end which are received in the undercut 34. These die members 35 are also provided with tongues 37 at their other ends. A ring or plate 38 overlies the tongues 37 and is secured to the base member 32 by screws 39. Thus, the ring or plate 38 and the undercut 34 cooperate with the tongues 36 and 37 of the die members 35 for rigidly and firmly securing the die members 35 in place on the base member 32 about the central planar die portion 33. The die members 35 are contoured, as indicated at 42, into the desired shape for forming the desired ruffles on the doily. The plurality of radially arranged die members 35 thereby present a uniform undulating surface about the central planar portion, this undulating surface being simply and inexpensively produced by means of these separate die members 35.

The mating die 26 includes a base member 42 which is provided with a central opening receiving a die member 41 having a planar die portion 43 which is also undercut as indicated at 44. Here also, a plurality of die members 45 are radially arranged about the central planar die portion 43 and are provided with tongues 46 received in the under cut 44 and with tongues 47 which are secured by a ring or plate 48 and screws 49 to the base member 42. The central planar portion 43 mates with the central planar portion 33 of the other die, and the undulating marginal die portion formed by the die members 45 mates with the undulating marginal die portion formed by the die members 35 of the other die. The contour 50 of the die members 45 matches the contour 40 of the die members 35 so as to provide flush engagement therebetween when the pair of dies are brought together. Likewise, the central planar die portions 43 and 33 face about each other when the pair of dies are brought together.

The other pair of dies 27, 28 correspond to the first pair of dies and are constructed and operate in the same manner. Here, the die 27 includes the same base member 42 and die member 41 as the die 26, the die member 41 being provided with a central planar die portion 53 which is undercut as indicated at 54, a plurality of radially arranged die members 55 having tongues 56 received in the undercut 54 and tongues 57 which are engaged by a plate or ring 58 secured to the base member 42 by screws 49. The die member 28 includes a base member 62 which is secured to the movable head 19 and which includes a central planar die portion 63 held in place thereon by screws. The planar die portion 63 is undercut at 64 for receiving tongues 66 of die members 65. Tongues 67 on the die members 65 are engaged by a plate or ring 68 which is secured to the base member 62 by screws 62. The die members 55 and 65 are contoured, as indicated at 60 and 70, in a similar fashion as the die members 35 and 45.

Thermoplastic material is fed from the pressure feed line 18 in the head 16 through a central opening 72 in the base member 32 for outward flow between the pair of dies 25 and 26. When the dies are closed, a central opening 73 in the die member 41 communicates with the central opening 72 for feeding thermoplastic material between the pair of dies 27 and 28. The central planar die portions 43 and 63 of the dies 26 and 28 and the die members 45 and 65 forming the marginal die portions of the dies 26 and 28 are provided with interconnecting grooves extending from the center of the dies predominantly radially outwardly therefrom. Thus, when the dies are closed and thermoplastic material is injected under pressure into the dies, the thermoplastic material flows radially outwardly from the central opening 72 through the grooves in the die 26 and radially outwardly from the central opening 73 through the grooves in the die 28 to form or mold the ruffled doily such as illustrated in Figs. 1 to 3, the grooves forming the webs of the open design ruffled doily. Because the pairs of dies are arranged in tandem, as illustrated, the pressure required to hold the dies tightly closed is considerably less than the pressure which would be required if the pairs of dies were arranged side by side. As a result, the tendency of the thermoplastic material to flash between the webs is greatly minimized and clean-cut doilies are formed with exertions of minimum pressures. When the ruffled doilies are so formed, the pairs of dies are separated, and the formed ruffled doilies may be readily removed from the dies. By making the marginal undulating die portions of the dies from separate die elements, the fabrication of these undulating marginal die portions is greatly simplified. The various die members may be acurately contoured and may be accurately provided with the desired grooves. Preferably, the grooving is accomplished by an etching process.

To facilitate removal of the formed ruffled doilies from the dies when the dies are opened, they are provided with knock-out mechanisms as illustrated in Figs. 11–15, the dies 26 and 28 having the grooves etched thereon being provided with the knock-out mechanisms. Referring specifically to the die 26, the ring or plate 48 and base member 42 are provided with a longitudinally extending hole 75 in which a pin 76 is slidably mounted, the pin 76 being urged outwardly by a spring 77. The pin 76 is provided with a groove or key-way 78 which receives the end of a screw 79 threadedly mounted in a hole 80 in the plate 48. The screw 79, therefore, operates to maintain the pin 76 in the appropriate rotative position and also operates to limit the extent of longitudinal movement of the pin 76. The pin 76 is also provided with a recess 81 for receiving a finger 82 which is slidably received in a notch 83 in the die member 45. The finger 82 is secured in place in the pin 76 by a set screw 84. When the pin 76 is retracted against the action of the spring 77 when the dies are closed, the contour of the finger 82 matches the contour of the die member 45 so as to form a continuation of the undulating surface thereof. After a ruffled doily is molded and the dies 25 and 26 are separated, the spring 77 pushes the pin 76 and its finger 82 outwardly so as to remove the ruffled doily from the associated die member 45 as shown more clearly in Fig. 13. Thus, the doily may be readily grasped for removing the same from the die 25. The die 28 is provided with an identical knock-out mechanism as is shown in Fig. 12.

While, for purposes of illustration, one form of a single piece ruffled doily and one form of die construction and method for forming the ruffled doily have been disclosed, other forms thereof may become apparent to those skilled in the art upon reference to this disclosure and, therefore, this invention should be limited only by the scope of the appended claims.

We claim as our invention:

1. A die construction for molding a single piece thermoplastic doily, comprising, a pair of relatively movable dies having means for injecting a thermoplastic material therebetween when the dies are closed for molding the doily, and a knock-out mechanism carried by one of the dies and including a pin slidably mounted outside of the confines of the doily and a finger carried by the pin and extending into a recess in the die within the confines of the doily, said pin and finger being retracted when the dies are closed, and a spring advancing the pin and finger when the dies are opened for stripping the doily from the die.

2. A molded single piece synthetic plastic ruffled doily comprising a single sheet of synthetic plastic material which is of substantially the same thickness throughout, which is flexible and resilient throughout, which has a permanent preset configuration to which it resiliently returns following flexing therefrom, and which in permanent preset configuration has a planar central portion and a marginal portion about the central portion, said marginal portion having a surface area from the central portion to its outer periphery which is progressively greater than a corresponding planar area and being uniformly formed in ruffles which increase in ampltiude from the central portion to its outer periphery.

3. A molded single piece synthetic plastic ruffled doily comprising a single sheet of synthetic plastic material which is of substantially the same thickness throughout, which is flexible and resilient throughout, which has a permanent preset configuration to which it resiliently returns following flexing therefrom, and which in permanent preset configuration has a planar central portion and a marginal portion about the central portion, said marginal portion having a surface area from the central portion to its outer periphery which is progressively greater than a corresponding planar area and being uniformly formed in ruffles which increase in amplitude from the central portion to its outer periphery, said central and marginal portions having openings therein for ornamentation purposes.

4. A molded single piece synthetic plastic ruffled doily of open design comprising a single sheet of synthetic plastic material consisting of synthetic plastic webs extending predominantly radially from the center, which is of substantially the same thickness throughout, which is flexible and resilient throughout, which has a permanent preset configuration to which it resiliently returns following flexing therefrom, and which in permanent preset configuration has a planar central portion including said webs and a marginal portion including said webs arranged about the central portion, said marginal portion having a surface area from the central portion to its outer periphery which is progressively greater than a corresponding planar area and being uniformly formed in ruffles which increase in amplitude from the central portion to its outer periphery.

5. A die construction for molding a single piece synthetic plastic ruffled doily which consists of a single sheet of synthetic plastic material which is of substantially the same thickness throughout, which is flexible and resilient throughout, which has a permanent preset configuration to which it resiliently returns following flexing therefrom, and which in permanent preset configuration has a planar central portion and a marginal portion about the central portion having a surface area from the central portion to its outer periphery which is progressively greater than a corresponding planar area and being uniformly formed in ruffles which increase in amplitude from the central portion to its outer periphery, comprising, a pair of relatively movable mating dies having in the mating surfaces thereof a molding cavity of substantially uniform depth, having a central opening therein communicating with the molding cavity for injecting a relatively flexible and resilient synthetic plastic material therein, each die including a base member carrying a central planar die portion having an undercut around the edge thereof, a plurality of die members having tongues at their ends and radially arranged about the central planar die portion with the tongues at the inner ends thereof received in the undercut of the central planar die portion, and a ring secured to the base member and overlying the tongues at the outer ends of the die members for receiving the die members in place on the base member about the central planar die portion, the radially arranged die members of the pair of dies providing uniform alternate male and female sections which increase in amplitude from the central portions to their outer peripheries.

6. A die construction for molding a single piece synthetic plastic ruffled doily of open design which consists of a single sheet of synthetic plastic material comprising webs extending predominantly radially from the center, which is of substantially the same thickness throughout, which is flexible and resilient throughout, which has a permanent preset configuration to which it resiliently returns following flexing therefrom, and which in permanent preset configuration has a planar central portion including said webs and a marginal portion including said webs arranged about the central portion having a surface area from the central portion to its outer periphery which is progressively greater than a corresponding planar area and being uniformly formed in ruffles which increase in amplitude from the central portion to its outer periphery, comprising, a pair of relatively movable mating dies having on the mating surfaces thereof molding grooves of substantially uniform depth and extending predominantly radially from the center toward the periphery thereof, having a central opening therein communicating with the molding grooves for injecting a relatively flexible and resilient synthetic plastic material therein for outward flow therethrough, each die including a base member carrying a central planar die portion including said grooves and having an undercut around the edge thereof, a plurality of die members including said grooves and having tongues at their ends and radially arranged about the central planar die portion with the tongues at the inner ends thereof received in the undercut of the central planar die portion, and a ring secured to the base member and overlying the tongues at the outer ends of the die members for receiving the die members in place on the base member about the central planar die portion, the radially arranged die members of the pair of dies providing uniform alternate male and female sections which increase in amplitude from the central portions to their outer peripheries.

7. A die construction for molding a single piece synthetic plastic ruffled doily which consists of a single sheet of synthetic plastic material which is of substantially the same thickness throughout, which is flexible and resilient throughout, which has a permanent preset configuration to which it resiliently returns following flexing therefrom, and which in permanent preset configuration has a planar central portion and a marginal portion about the central portion having a surface area from the central portion to its outer periphery which is progressively greater than a corresponding planar area and being uniformly formed in ruffles which increase in amplitude from the central portion to its outer periphery, comprising, a pair of relatively movable mating dies having in the mating surfaces thereof a molding cavity of substantially uniform depth, having a central opening therein communicating with the molding cavity for injecting a relatively flexible and resilient synthetic plastic material therein, and including central mating planar portions and marginal mating portions having uniform alternate male and female sections which increase in amplitude from the central portions to their outer peripheries, and a knock-out mechanism carried by one of the dies and including a pin slidably mounted outside of the confines of the marginal mating portion thereof and a finger carried by the pin and extending into a recess within the confines of the marginal mating portion thereof, said pin and finger being retracted when the dies are closed, and a spring advancing the pin and finger when the dies are opened for stripping the doily from the die.

8. A die construction for molding a single piece synthetic plastic ruffled doily of open design which consists of a single sheet of synthetic plastic material comprising webs extending predominantly radially from the center, which is of substantially the same thickness throughout, which is flexible and resilient throughout, which has a permanent preset configuration to which it resiliently returns following flexing therefrom, and which in permanent reset configuration has a planar central portion including said webs and a marginal portion including said webs arranged about the central portion having a surface area from the central portion to its outer periphery which is progressively greater than a corresponding planar area and being uniformly formed in ruffles which increase in amplitude from the central portion to its outer periphery, comprising, a pair of relatively movable mating dies having in the mating surfaces thereof molding grooves of substantially uniform depth and extending predominantly radially from the center toward the periphery thereof, having a central opening therein communicating with the molding grooves for injecting a relatively flexible and resilient synthetic plastic material therein for outward flow therethrough, and including central mating planar portions including said grooves and marginal mating portions including said grooves and having uniform alternate male and female sections which increase in amplitude from the central portions to their outer peripheries, and a knock-out mechanism carried by one of the dies and including a pin slidably mounted outside of the confines of the marginal mating portion thereof and a finger including said grooves carried by the pin and extending into a recess within the confines of the marginal mating portion thereof, said pin and finger being retracted when the dies are closed, and a spring advancing the pin and finger when the dies are opened for stripping the doily from the die.

References Cited in the file of this patent

UNITED STATES PATENTS

| | | |
|---|---|---|
| 999,303 | Falk | Aug. 1, 1911 |
| 2,448,640 | Weston | Sept. 7, 1948 |
| 2,502,772 | Winstead | Apr. 4, 1950 |
| 2,602,190 | Hein et al. | July 8, 1952 |
| 2,610,111 | Stanley | Sept. 9, 1952 |
| 2,698,460 | Amo | Jan. 4, 1955 |
| 2,733,479 | English | Feb. 7, 1956 |
| 2,781,651 | Cutler | Feb. 19, 1957 |